United States Patent
Zackrisson

(10) Patent No.: US 8,862,093 B2
(45) Date of Patent: *Oct. 14, 2014

(54) TERMINAL-INITIATED OVERRIDE OF CHARGING SYSTEM RULES

(75) Inventor: Peter Zackrisson, Lyckeby (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 156 days.

This patent is subject to a terminal disclaimer.

(21) Appl. No.: 13/538,000

(22) Filed: Jun. 29, 2012

(65) Prior Publication Data

US 2014/0004820 A1    Jan. 2, 2014

(51) Int. Cl.
*H04M 11/00*    (2006.01)

(52) U.S. Cl.
USPC ........... 455/406; 455/405; 455/407; 455/408; 455/410; 455/411

(58) Field of Classification Search
USPC ................. 455/406, 405, 407, 408, 410, 411
See application file for complete search history.

(56) References Cited

U.S. PATENT DOCUMENTS

| | | |
|---|---|---|
| 2002/0022472 A1 | 2/2002 | Walter et al. |
| 2004/0121758 A1 | 6/2004 | Hoche et al. |
| 2006/0019630 A1* | 1/2006 | Sposato et al. ............... 455/406 |
| 2009/0076952 A1 | 3/2009 | Cadenas et al. |
| 2010/0104076 A1 | 4/2010 | Abrahamsson et al. |
| 2011/0053555 A1* | 3/2011 | Cai et al. ....................... 455/406 |
| 2014/0004821 A1* | 1/2014 | Lindau Nordhammer et al. .......................... 455/406 |

FOREIGN PATENT DOCUMENTS

EP    1 881 688 A1    1/2008

OTHER PUBLICATIONS

RFC 3588, Calhoun et al., "Diameter Base Protocol," Sep. 2003.
RFC 4006, Hakala et al., "Diameter Credit-Control Application", Aug. 2005.
U.S. Appl. No. 12/258,990 of Ambrahamsson et al., "Real-Time Flexible Account Selection for Communications," filed Oct. 27, 2008.
U.S. Appl. No. 13/464,397 of Wahlberg et al., "Product-Centric Charging System and Method," filed May 4, 2012.
U.S. Appl. No. 13/538,340 of Nordhammer et al., "Telecommunications Charging with Externally-Controlled Account Selection," filed Jun. 29, 2012.
Office Action issued in U.S. Appl. No. 12/258,990 dated Mar. 30, 2012.
International Search Report and Written Opinion mailed Oct. 27, 2009 in PCT Application No. PCT/SE2009/050849.

* cited by examiner

*Primary Examiner* — Khalid Shaheed
(74) *Attorney, Agent, or Firm* — Baker Botts L.L.P.

(57) ABSTRACT

A method of operating a communications charging system comprises receiving an override message comprising an override code indicative of a charging rule override request which affects a terminal. The method further comprises, in response to the override code, making an association of a use of the terminal during an override term to an alternate account rather than to a default account as would otherwise occur by a charging rule; and thereafter at reception of a charging request which is subsequent and separate from the override message, allocating a charge for a service for which the charging request occurs to the alternate account in accordance with the association.

28 Claims, 11 Drawing Sheets

TERMINAL-INITIATED OVERRIDE OF CHARGING SYSTEM RULES

TECHNICAL FIELD

The technology relates to charging or financial account rendering for use of services, such as telecommunications services, for example.

BACKGROUND

For many products and/or services a customer or subscriber desires that a financial charge for the product/service be satisfied or paid from one or more of accounts, e.g., asset accounts owned by the customer or authorized for the customer's use. The debiting of the appropriate accounts, or reserving of assets in the appropriate accounts, is generally handled by a charging system.

Some contemporary charging systems support shared accounts, e.g., the ability of a same subscriber or customer to use both a personal account and a company account. For example, in some charging systems the subscriber may begin a call with a certain prefix number or the like which serves to select which of plural possible accounts is to be used.

Some charging systems have the ability to check or monitor the identity of the sender or the receiver (e.g., the B-number) and to select either of plural possible accounts accordingly. For example, if the B-number is part of a company listing of numbers, the charge for the call is attributed to the company. But in such case it is not possible to charge calls between two colleagues who are personal friends.

SUMMARY

In one of its aspects the technology disclosed herein concerns a method of operating a communications charging system. The method comprises receiving an override message comprising an override code indicative of a charging rule override request which affects a terminal. The method further comprises, in response to the override code, making an association of a use of the terminal during an override term to an alternate account rather than to a default account as would otherwise occur by a charging rule; and thereafter at reception of a charging request which is subsequent and separate from the override message, allocating a charge for a service for which the charging request occurs to the alternate account in accordance with the association.

In an example embodiment and mode the method further comprises receiving, from a source other than the terminal, the override code indicative of the charging rule override request which affects the terminal.

In an example embodiment and mode wherein the service is initiated by a service request message which is subsequent and separate from the override message, the method further comprises the charging system during the override term automatically allocating the charge to the alternate account without any additional indication in or accompanying the service request message that the service is to be associated with the alternate account.

In an example embodiment and mode the method further comprises allocating the charge to the alternate account during the override term and also for a time thereafter until the service terminates.

In an example embodiment and mode the method further comprises allocating the charge during the override term to the alternate account rather than to the default account when the service involves use of a specified service.

In an example embodiment and mode the method further comprises, at the charging system and in response to the override code, creating an instance of an override product for use by the terminal, the instance of the override product being configured to associate use of the terminal for the override term to the alternate account rather than to the default account.

In an example embodiment and mode the method further comprises the override message including an indication of the override term, and the charging system obtaining the override term from the override message.

In an example embodiment and mode the method further comprises the charging system determining the override term.

In an example embodiment and mode the method further comprises configuring the override term at the charging system.

In an example embodiment and mode the method further comprises the override term lasting until reception of an override rescind message.

In an example embodiment and mode one of the default account and the alternate account is a business account and another of the default account and the alternate account is a personal account.

In an example embodiment and mode the default account is a first family member account and the alternate account is a second family member account In an example embodiment and mode the method further comprises receiving the override code through the Internet.

In an example embodiment and mode the method further comprises receiving the override code in a voice call with consultation of a Home Location Register.

In an example embodiment and mode the method further comprises receiving the override code in a Unstructured Supplementary Services Data message with consultation of a Home Location Register, In an example embodiment and mode the method further comprising receiving the override code in a Short Message Service (SMS) message from a transit network, the transit network comprising a Short Message Service Center (SMSC) node.

In an example embodiment and mode the method further comprises using a logic processing circuit to perform the acts of the charging system.

In another of its aspects the technology disclosed herein concerns a charging system configured to associate a use of a terminal during an override term to an alternate account rather than to a default account in response to an override code received in an override message. The charging system is further configured, in conjunction with a charging request which is subsequent and separate from the override message, to allocate a charge for a service for which the charging request occurs to the alternate account in accordance with the association In an example embodiment the system further comprises an interface through which the override code indicative of the charging rule override request is received from a source other than the terminal.

In an example embodiment wherein the service is initiated by a service request message which is subsequent and separate from the override message, the charging system is configured, during the override term, to automatically allocate the charge to the alternate account without any additional indication in or accompanying the service request message that the service is to be associated with the alternate account.

In an example embodiment the charging system is further configured to allocate the charge to the alternate account during the override term and also for a time thereafter until the service terminates.

In an example embodiment the charging system is configured to allocate the charge during the override term to the alternate account rather than to the default account when the service involves use of a specified service.

In an example embodiment the charging system is configured, in response to the override code, to create an instance of an override product for the terminal, the instance of the override product being configured to associate use of the terminal for the override term to the alternate account rather than to the default account.

In an example embodiment wherein the override message further includes an indication of the override term, the charging system is configured to obtain the override term from the override message.

In an example embodiment the charging system is configured to determine the override term.

In an example embodiment the override term is configured at the charging system.

In an example embodiment the override term lasts until reception of an override rescind message.

In an example embodiment one of the default account and the alternate account is a business account and another of the default account and the alternate account is a personal account.

In an example embodiment the default account is a first family member account and the alternate account is a second family member account.

In an example embodiment the charging system further comprises an interface through which the charging system receives the override message from the Internet.

In an example embodiment the charging system further comprises an interface through which the charging system receives the override code when the override message is included in a voice call.

In an example embodiment the charging system further comprises an interface through which the charging system receives the override code when the override message comprises a Unstructured Supplementary Services Data message.

In an example embodiment the charging system further comprises an interface through which the charging system receives the override code when the override message comprises a Short Message Service (SMS) message.

In an example embodiment the charging system further comprises a logic processing circuit.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
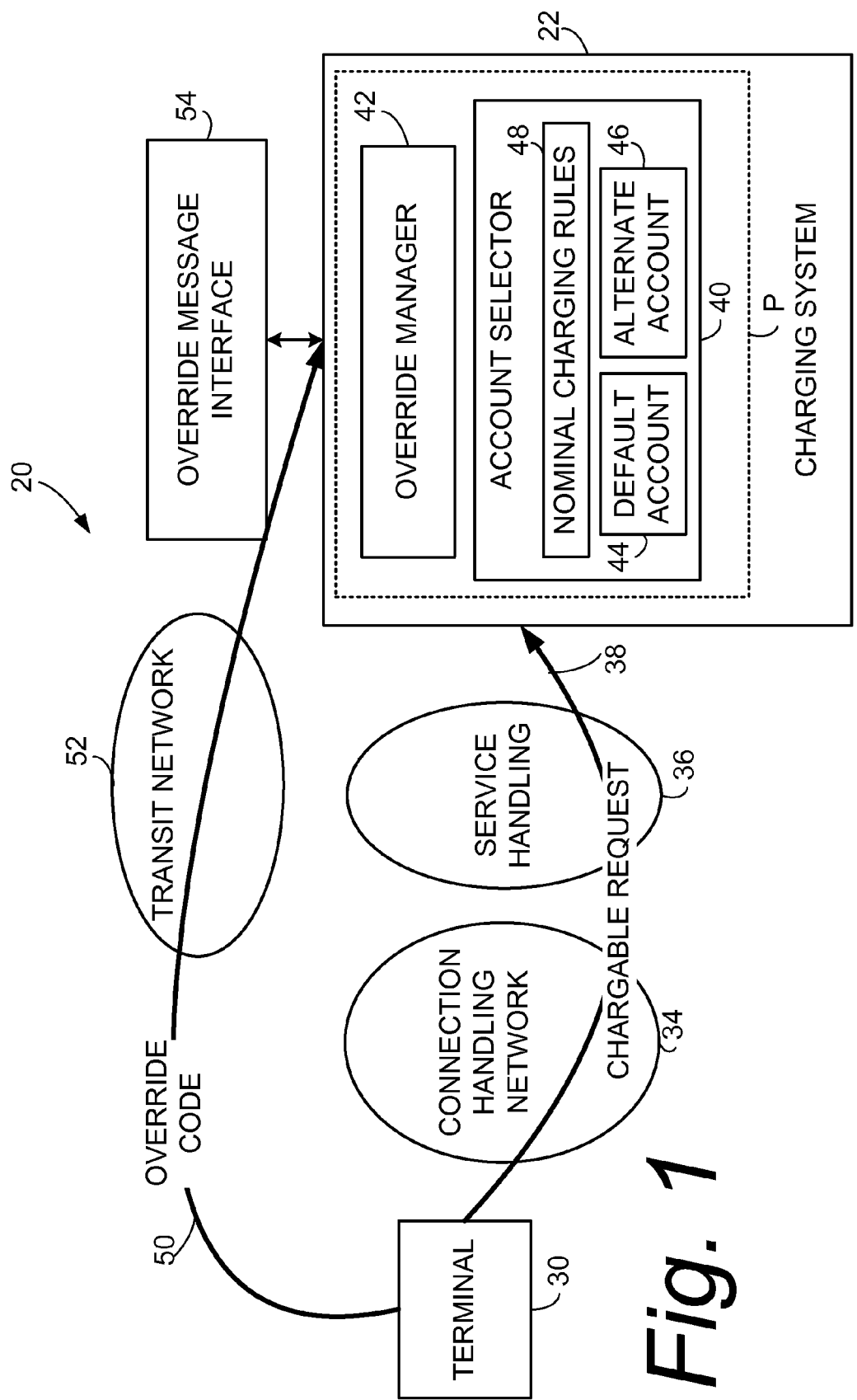
FIG. 1 is a diagrammatic view of a communication system comprising a charging system according to an example embodiment.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

As alluded to above, one mobile phone (e.g., terminal) may be used for different types of telecommunication activity, e.g., for both company activity (e.g., company calls or company-related browsing) and personal activity (e.g., personal calls or personal browsing). As used herein, telecommunication activity(ies) encompasses both telephone call services and use of data services, all such telecommunications activity herein being also referred to as a "service". In some cases the company allows that personal telecommunication activities are also paid by the company, but in some cases the company only wants to pay for telecommunication activities which are related to work. For the latter case either some basic rules can be created or the employee may require one personal mobile and one company mobile.

According to the technology disclosed herein, one phone (e.g., one terminal) is used for both company telecommunication activities and personal telecommunication activities, there being provided by the technology disclosed herein the possibility of an override of the charging basic rules. The charging override as provided by the technology disclosed herein is particular advantageous in a scenario in which, for example, a company is willing to pay for the mobile phone equipment itself and company telecommunication activities, but is not willing to pay for personal telecommunication activities.

FIG. 1 shows a communication system 20 wherein charging system 22 is employed to obtain revenue for use of telecommunications services by a device such as terminal 30. The terminal 30 may be any type of telecommunications equipment, e.g., wireless or wired. The charging system 22 serves, e.g., to associate use of a service by the wireless terminal 30 with an appropriate one of possible plural available accounts. Use of the service by terminal 30 occurs as the terminal 30 participates in (e.g., initiates, terminates, or is otherwise engaged in) a telecommunications activities using a telecommunications service. The service may use a circuit switched connection or a packet switched connection, and may be a call or a session (such as an Internet session, for example). The service typically involves use of a connection handling network 34 (e.g., a radio access network and/or a core network in the case of a wireless terminal, for example) and/or service handling functionality 36 of the communication system 20. Use by the terminal 30 of one or more connection handling networks 34 and/or service handling functionality 36 involves telecommunication activities which in turn result in notification of a chargeable event (depicted by arrow 38) to charging system 22.

The charging system 22 comprises account selector 40 and override manager 42. The account selector 40 associates each of the telecommunications activities or transactions for which the charging system 22 has financial responsibility with at least one account. The association to the accounts may occur upon receipt of a charging request. As understood by those skilled in the art, the account selector 40 has access to a data base of accounts, one or more of which may be eligible for charging for use of terminal 30 of any particular service or product. For sake of simplicity FIG. 1 shows account selector 40 as having access to two accounts, e.g., a default account 44 and an alternate account 46. The default account represents the account that the account selector 40 would normally use at a certain point in time in accordance with the existing or nominal charging rules 48 established for the charging system 22. The override manager 42 serves to create an override state. The override state circumvents or overrides those nominal charging rules 48 so that, rather than the default account 44 being selected, the alternate account 46 is instead selected.

What constitutes a default account and an alternate account may depend on the circumstances of use or be specified by the telecommunications or override service provider. For example, in some situations the default account may be a personal account and the alternate account a business account (e.g., an account of an employer or company), or vise versa. In other situations the default account may be a first family member account and the alternate account may be a second family member account, or vise versa.

In response to an override code 50 received in an override message, the charging system 22 enters the override state for the terminal which is affected by the override code. In the override state the charging system 22 associates a charge occasioned by use of a terminal to the alternate account 46 rather than to the default account 44. FIG. 1 shows by an arrow that override code 50 is carried to charging system 22 by an override message. The override message which carries override code 50 travels through transit network 52 and, in an example embodiment, terminates at override message interface 54. The override message interface 54 transmits, e.g., the override code 50, to charging system 22. The transit network 52 may include some or all of connection handling network 34, or other networks, nodes, and servers (examples of which are provided herein).

Figure 2:
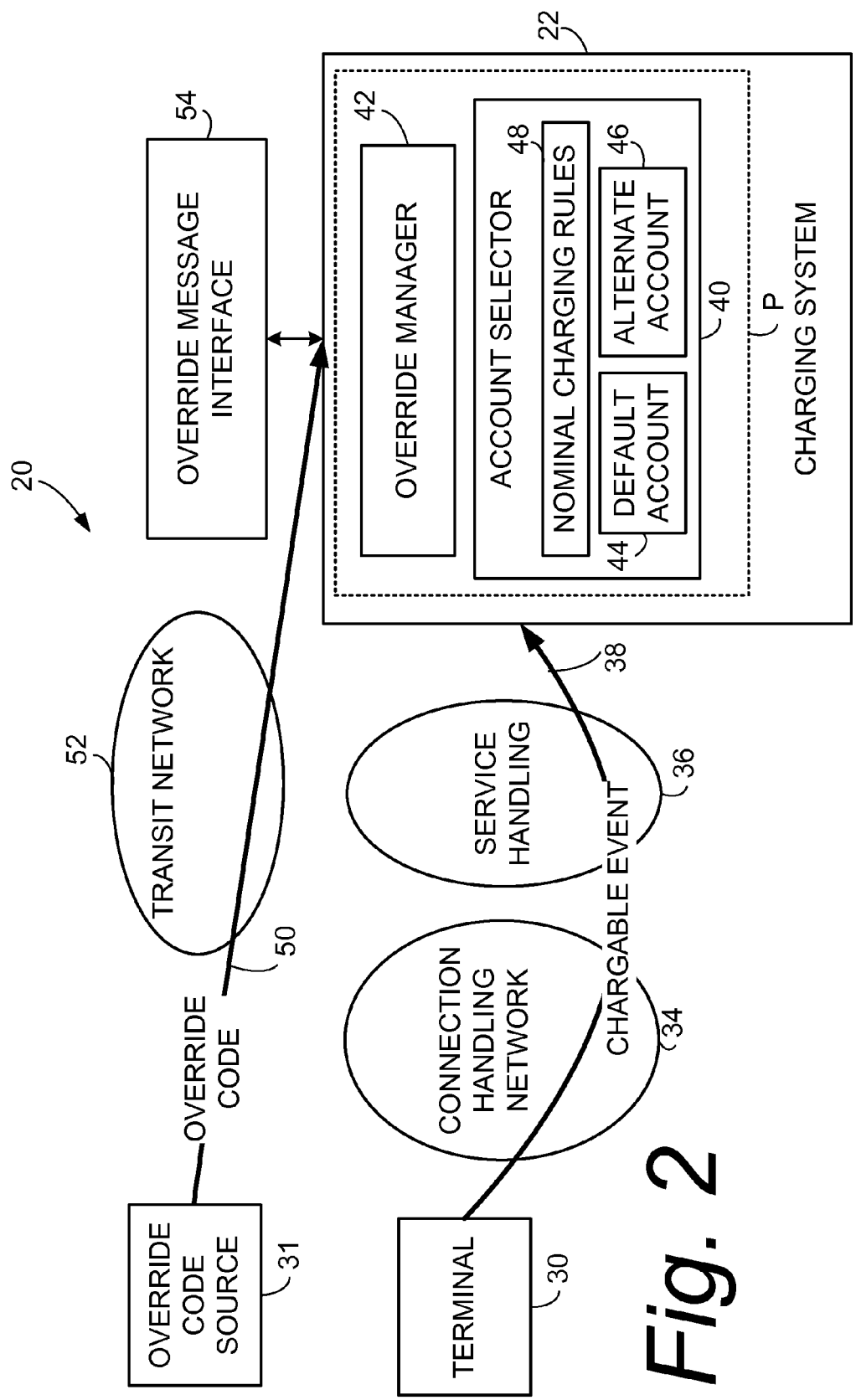
FIG. 2 is a diagrammatic view of a communication system comprising a charging system according to another example embodiment.

In the particular example embodiment shown in FIG. 1 the override message which carries override code 50 is generated at the terminal 30 which is affected by the override code. The override message travels through transit network 52 and, in an example embodiment, terminates at override message interface 54. However, it should be appreciated that in other embodiments, such as those generically depicted by FIG. 2, the override message may be generated at a source 31 other than the override code-affected terminal, e.g., by a terminal or device other than terminal 30. For example, the override message may be generated at or by another terminal, either wireless or wired, such as a mobile station, a web portal. In other words, the override message may be generated by a person other than a user of the override code-affected terminal, e.g., by an administrator or receptionist of a company, for example. Unless otherwise noted, the ensuing description applies to either mode of generation of the override message, either generated by the code-affected terminal or another source.

The technology disclosed herein enables override of the default charging rules in a simple way either by toggling the payer (e.g., by sending USSD) or making the call for a specific time, during an override term. That is, the charging system 22 associates a charge occasioned by use of terminal 30 to the alternate account 46 (rather than to the default account 44) during an override term. The override "term" may be described in any suitable measure, such as by time (such as by an override time period), or resource measure (e.g., resource quantity or quality), event(s) [e.g., number of events], or combination(s) thereof. For example, use of the alternate account may be specified either in terms of a time period (e.g., a stated number of minutes or hours), or in terms of a unit such as megabytes, or in terms of a number of telecommunications transactions (e.g., ten SMS transactions). An example of a combination of differing term measures is an override specified to apply to only 100 Megabytes and only if those 100 Megabytes are consumed within one hour of receipt of the override code.

Moreover, and as explained further herein, what constitutes the "override term" may (e.g., in differing embodiments and modes) either be specified in the override message (in which case, e.g., the charging system obtains the override term from the override message); be configured at the charging system 22; determined by the charging system 22; or may last until reception of an override rescind message from the terminal.

An illustration of a situation in which an example override is beneficial is that of a company whose basic rule or policy is that that company pays for telecommunication activities made on certain days and/or during certain hours, for example weekdays within office hours (e.g., M-F 08:00-17:00). In such case the technology disclosed herein facilitates triggering an overriding of this basic rule or policy in various ways, such as terminal 30 or terminal 31 sending an override code 50 as a USSD/SMS request or by the terminal 30 or source 31 entering the override code 50 by calling a specific number. Of course, there are other means of entering and/or transmitting the override code 50, e.g., a call to a specific number leading to an IVR (Interactive Voice Response system) or by sending a SMS or contacting an external web portal, for example.

In an example scenario, a override code initiator (e.g., a subscriber in the case of terminal 30 of FIG. 1) may dial or enter the following string (using USSD): *123[*90]#. In this string, the numerals 123 signify "Use company account" for override purposes and the optional numerals 90 signify that the override is to last for an override time period of 90 minutes. In such a scenario using such string it is possible to override the basic rules for when company account is used for case 90 minutes.

Alternatively the override code initiator might have just entered or dialed *123#, which may signify "use company account" for a default term, such as the rest of the day. Having such a default override term is beneficial in case a subscriber/customer may forget to change back to normal rules.

For the above scenario it may also be possible to cancel the override order by using a predefined string of characters, e.g. using #123#.

Figure 3:
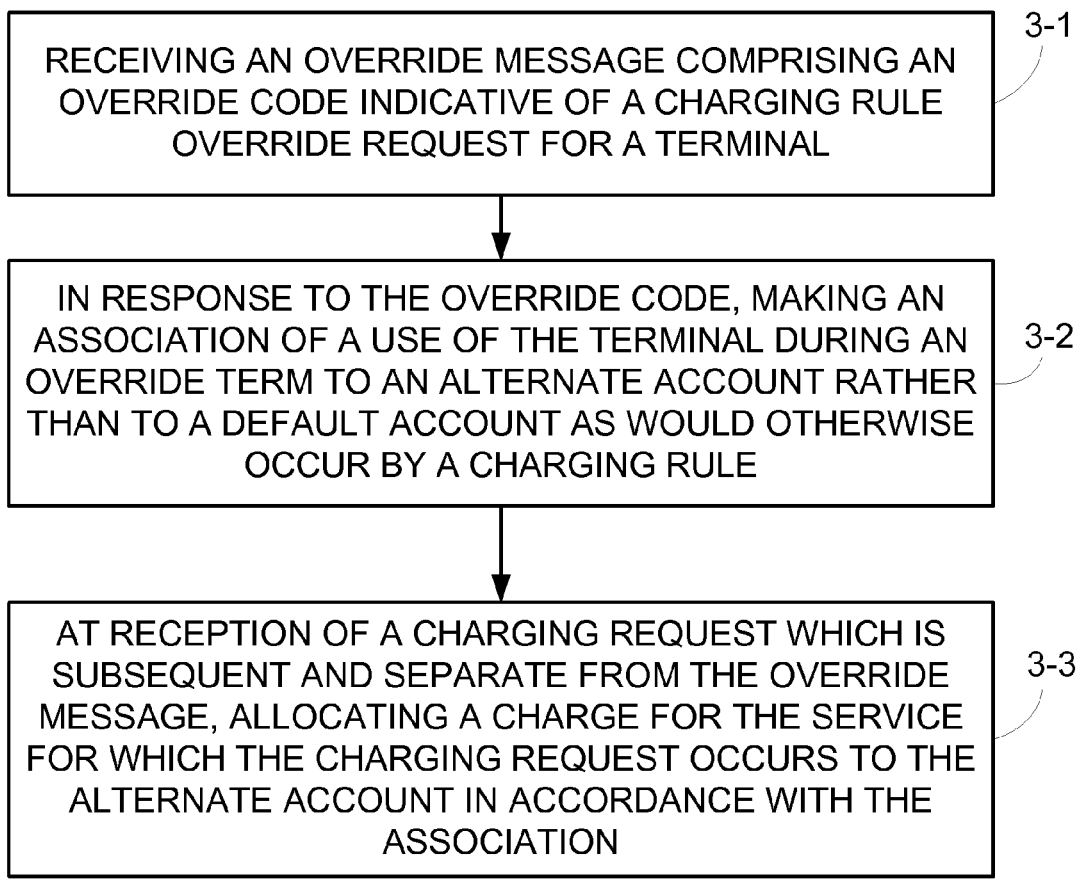
FIG. 3 is a flowchart showing example acts or steps which comprise an example embodiment of operating a charging system wherein charging override is implemented.

FIG. 3 shows example acts or steps which comprise an example embodiment of operating a charging system wherein charging override is implemented. Act 3-1 comprises receiving an override message comprising an override code indicative of a charging rule override request which affects the terminal 30. Reception of override code 50 via transit network 52 (from either terminal 30 or source 31) and via override message interface 54 as described above exemplify Act 3-1.

Act 3-2 comprises, in response to receipt of the override code, the charging system (now in the override state for the terminal) making an association of a use of the terminal during an override term to an alternate account. The "use" of the terminal may be evidenced by a charging request which is subsequent and separate from the override message, and such charging request may comprise or relate to an attempt by the terminal to initiate a service (e.g., a call or session), to receive a service, or any extent or event of participating in the service that results in generation of a charge (e.g., any use that constitutes a chargeable event). By "association" is broadly meant any linking, referencing, or pointing that administratively connects the alternative account to the particular use of the terminal. As a result of receipt of the override code 50, the alternate account is associated with the use of the terminal rather than a default account as would otherwise occur as a result of application of one or more of the charging rules 48.

After the association of act 3-2 has occurred, upon reception of the charging request the charging system 22 allocates a charge for the service for which the charging request occurs to the alternate account in accordance with the association. Such service may be setup by a service request message, the service request message being subsequent and separate from the override message. For such service, and as a result of receipt of override code 50 in the override message, the charging system 22 allocates a charge for the service to the alternate account in accordance with the association.

In an example embodiment and reflecting a further aspect and advantage of the technology disclosed herein, the service request message itself need not carry any indication that the service is to be associated with the alternate account. That is, setup or use of the service is without regard to whether the default account or the alternate account is to be charged, since the override code 50 which has already been provided to the charging system 22 has already established that the alternate account is to be charged. Thus, during the override term the charging system 22 automatically allocates the charge occasioned or required by the charging request to the alternate account, and does so without any additional indication in or accompanying the service request message (e.g., a special prefix that is entered by the operator) that the service is to be associated with the alternate account.

The technology disclosed herein thus concerns a charging system 22 which executes an override state when triggered by a signal such as override code 50 (carried, e.g., as USSD/SMS or to a web portal), optionally containing an override term value, such as an override time period (otherwise a configured time is used). In response to the triggering signal the charging system 22 creates a term-limited override state (for example an instance of a stored as a product in or outside the apparatus). The override state may be used to alter one or more of: (1) who will pay for charging events/sessions; (2) an order available products are used; and/or (3) activation or deactivation of certain products. In an example embodiment, when the time has passed the rules of charging (e.g., 48) are reinstated, the rules of charging go back to as before the override code 50 was initially received. In another example embodiment, override term could also be indefinite, in which case the override state product could be removed by issuing a similar type of signal, e.g., a signal to cancel the override state.

The following describe some basic, representative, example operational scenarios. It is assumed in these scenarios that the same phone (e.g., same terminal) and same phone number are used for both personal and company telecommunication activities. A basic default charging rule of these example scenarios is that the company pays for telecommunication activities within office hours 08:00-17:00. The subscriber has a private account and has a link to the company account which is used for company telecommunication activities. The subscriber may have two products handling the calling, one personal product (product private) and one company product (product company), with the product company having a higher priority than product private.

In accordance with an application of basic rating rules (e.g., nominal charging rules 48) the example logic of Table 1 may apply.

TABLE 1

Basic Rating Rules

If subscriber has product company
    If day in week = Monday to Friday
        If time = 08:00 to 17:00
            Use product Company
If subscriber has product private
    Use product Private Table 2 represents example logic for a Routing Tree Refill procedure, showing logic for both creation and removal of a product an override product which provides an override state such as that described above "Company outside office hours"). In accordance with the convention of Table 2, the string *123 (sent using USSD) is used to create the override product; the string #123 (sent using USSD) is used to remove the override product.

TABLE 2

Routing Tree Refill

If USSD procedure code = "*123"
    Create "Company outside office hours" product lasting from now, ending in $variable1 (where variable 1 is fetched from USSD string)
If USSD procedure code = "#123"
    Remove "Company outside office hours" product For an example override state created by the subscriber dialing, entering, or sending the following string: *123*90#. In such scenario a term-limited product ("Company outside office hours") lasting from product creation and 90 minutes in the future is created. When 90 minutes has passed the time limited product "Company outside office hours" is automatically removed. In an example embodiment and mode, notifications may be provided in advance of removal, e.g., close to removal, of time-limited product. The charging system may be configured to use the company account throughout the telecommunication activity even if the time limited offer stops being valid throughout the telecommunication activity.

Figure 5:
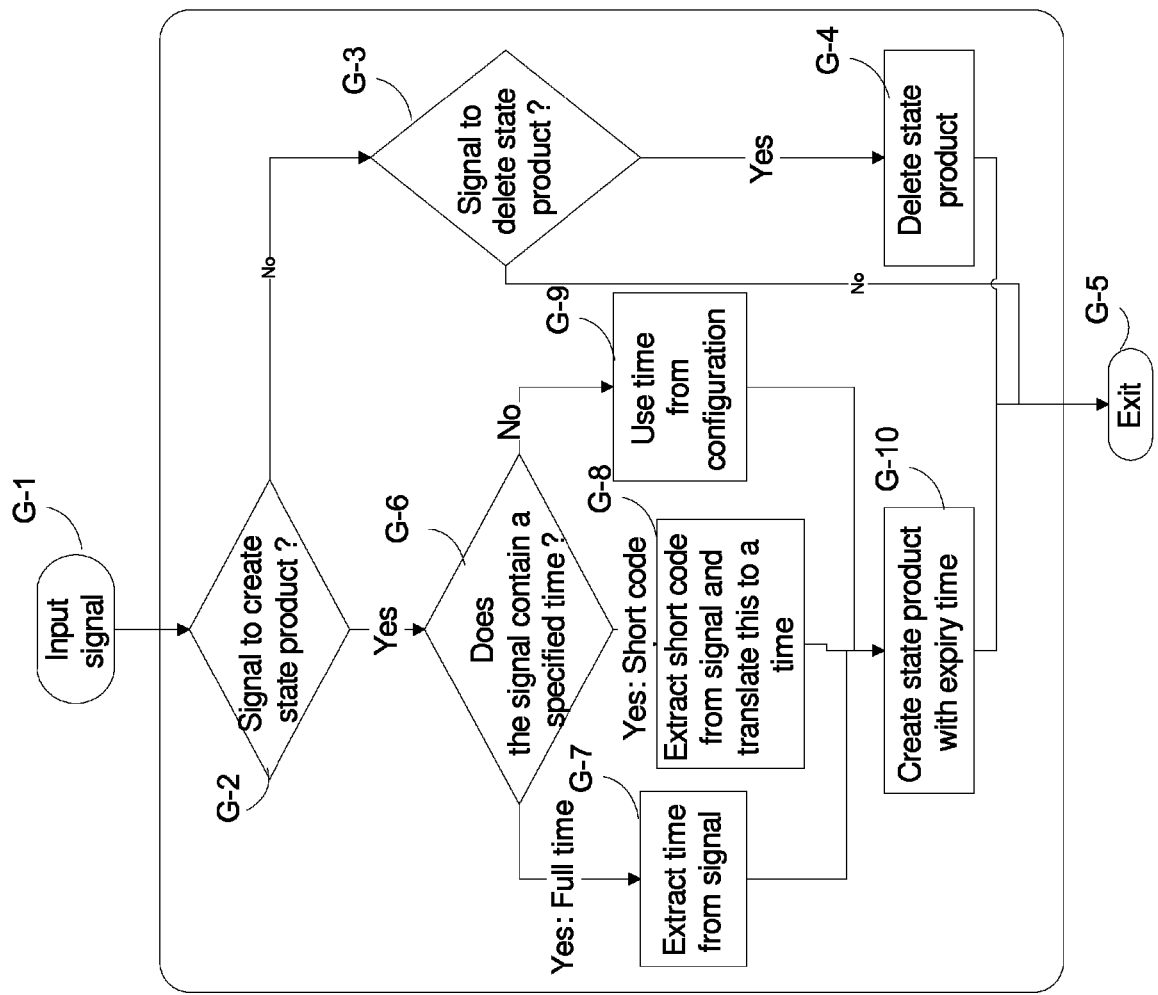
FIG. 5 is a flowchart showing example acts or steps for generating and removing an override state executed by an override manager according to an example embodiment.

FIG. 5 shows example acts or steps of an override creation and deletion routine executed by override manager 42 according to an example embodiment. As used herein, "override state" and "override product" are used interchangeably, and are understood to refer to an instance of the override product for a particular terminal.

Act 5-1 represents receipt of an input signal, e.g., from override message interface 54. Act 5-2 comprises checking to determine whether the input signal is a signal which indicates that a state product, e.g., an override state or override product, is to be created. In other words, act 5-2 comprises checking whether the input signal is an override code 50. If it is determined at act 5-2 that the input signal is not an override code, a check is made at act 5-3 whether the signal includes an indication that an override state product is to be deleted. If it is determined at act 5-3 that the override product is to be deleted, act 5-4 comprises deletion of the override product. After deletion of the override product, or if the determination of act 5-3 is negative, the execution of the override creation and deletion routine terminates as depicted the act 5-5 of FIG. 5.

If it is determined at act 5-2 that an override code 50 has been received as the input signal of act 5-1, act 5-6 is executed to determine whether the input signal contains a specified time. If the input signal and the form of the override code 50 includes a time specified in a "full-time" format, as act 5-7 such full-time value is extracted from the input signal. An example of a full time format for the time value is included in the input signal string *123*1800#, where the value 1800 may represent 18:00 or 6:00 PM. If, on the other hand, the input signal includes a time specified in a "short code" format, as act 5-8 the short code is extracted from the input signal and translated to a usable time value. An example of a full time format for the time value is included in the input signal string *123*1#, where the second 1 value appearing in the input string is extracted as the short code and converted to a known value such as midnight, for example. If the determination of act 5-6 is negative, as act 5-9 a configured time is used for the override term. After execution of any of act 5-7, act 5-8, and act 5-9, act 5-10 is performed wherein override manager 42 creates a state product with the appropriate expiration time. As mentioned above, creation of such a state product is actually creation of an instance of the state product for the affected terminal 30. Thereafter the override creation and deletion routine terminates as depicted the act 5-5 of FIG. 5.

Table 3 represents example logic (e.g., Modified Rating Rules) for an example override state created by the subscriber dialing, entering, or sending the following string: *123*90#. In such scenario a time-limited product ("Company outside office hours") lasting from product creation and 90 minutes in the future is created.

TABLE 3

Modified Rating Rules

Figure 6:
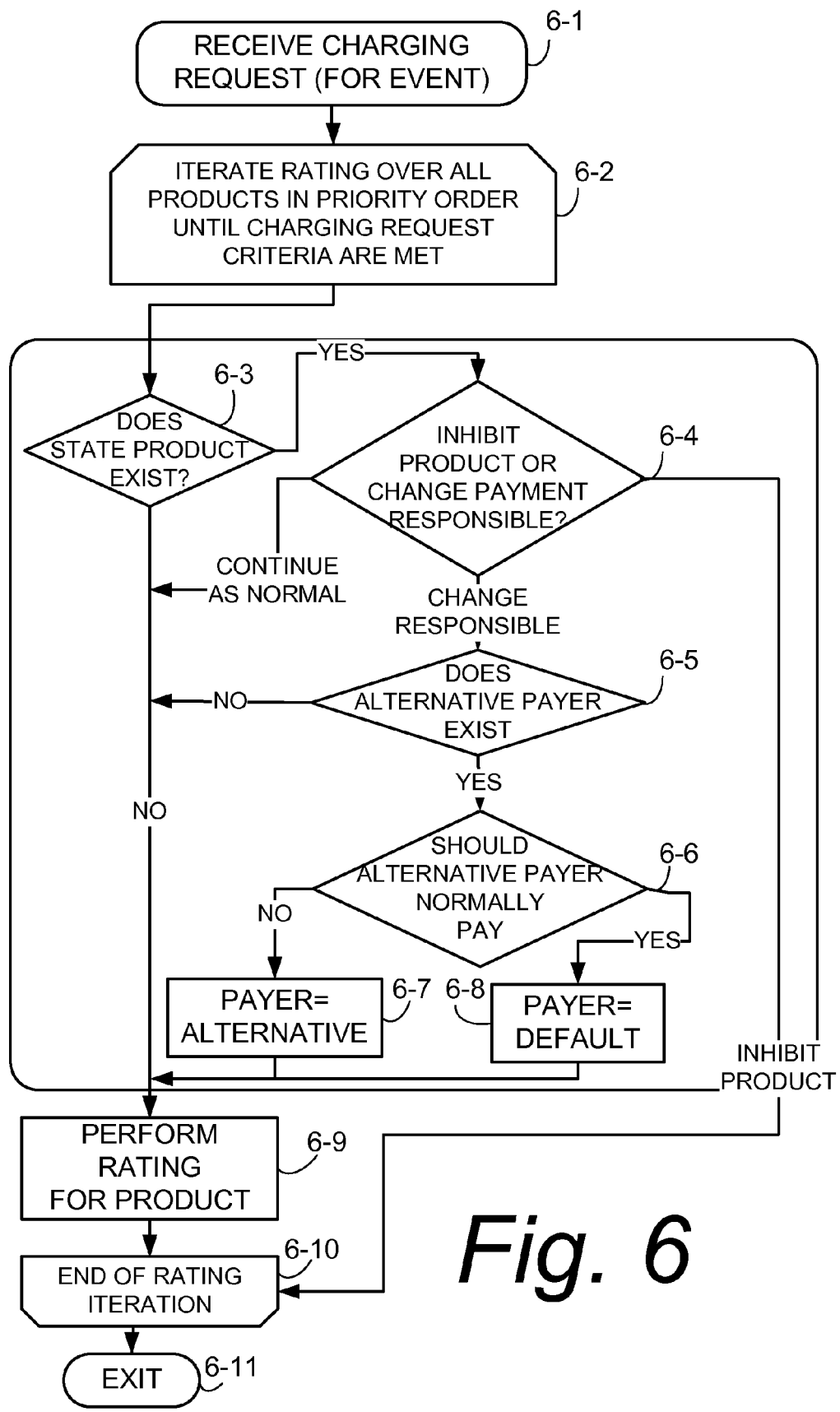
FIG. 6 is a flowchart showing example acts or steps performed by an override manager when executing a charging event routing including an instance of an example override product.

If subscriber has product company
    If subscriber has product "Company outside office hours"
        Use product Company for rating
        exit rating
    If day in week = Monday to Friday
        If time = 08:00 to 17:00
            Use product Company for rating
            exit rating
If subscriber has product private
    Use product Private for rating
    exit rating FIG. 6 shows example acts or steps performed by override manager 42 upon occurrence of a charging event, e.g., performance of a charging event routine. In FIG. 6 act 6-1 represents receipt of a charging request for an event as communicated to charging system 22. Act 6-2 comprises performing an iteration of a rating over all products in priority order until charging request criteria are met or satisfied. Act 6-3 comprises determining whether the state override product exists. If the state override product does not exist, execution continues with the rating for the appropriate product as act 6-9.

Act 6-4 through act 6-8 comprise acts of an actual override state or product. Act 6-4, executed upon an affirmative determination of act 6-3, comprises making a determination whether to inhibit the product of change payment responsible, e.g., determining whether the default account should be inhibited. If there is to be an inhibition of the default account, processing continues at act 6-10. If it is determined at act 6-4 that there is to be a change of the responsible account, a further check is made as act 6-5. The check of act 6-5 comprises determining whether an alternative payer/account actually exists. If there is no such alternative account or payer, the rating of act 6-9 (using the default account) is performed. If an alternative payer/account does exist, as act 6-6 a determination is made whether the alternative payer/account should normally pay. If the determination of act 6-6 is affirmative, the alternative account is selected for charging as represented by act 6-7. If not, the default account is selected for charging as represented by act 6-8. Act 6-9 comprises performing rating for the product using the selected account, and can be reached through by negative determinations at act 6-3, act 6-5, and after performance of act 6-7 or act 6-8. In addition, act 6-9 can be reached if it is determined at act 6-4 that the charging system should continue as normal. If the complete charging request is not rated (e.g., if, for example, the current product has exhausted the account to which it is connected or associated), or if the default account is determined to be inhibited at act 6-4, rating continues with the next product in priority order, as represented by loop symbol 6-10. In other words, acts of the loop shown enclosed in FIG. 6 are performed for a next product if a previously utilized product has not completed what is to be rated (e.g., if the previously utilized product has exhausted its associated account). When the charging request criteria are met, e.g., because the complete rating is finished, the routine is exited as depicted by act 6-11.

In differing embodiments and modes, the override message which carries the override code 50 from terminal 30 to, e.g., override message interface 54, may comprise (1) a voice call to an interactive voice response system; (2) a Short Message Service (SMS) message; (3) an Unstructured Supplementary Services Data (USSD) message; or (4) an Internet message. The technology disclosed herein facilitates override message transit modes corresponding to teach of the foregoing override message embodiments and modes, e.g., (1) a voice override message mode; (2) a SMS override message mode; (3) a USSD override message mode; and (4) an Internet override message mode.

Figure 4:
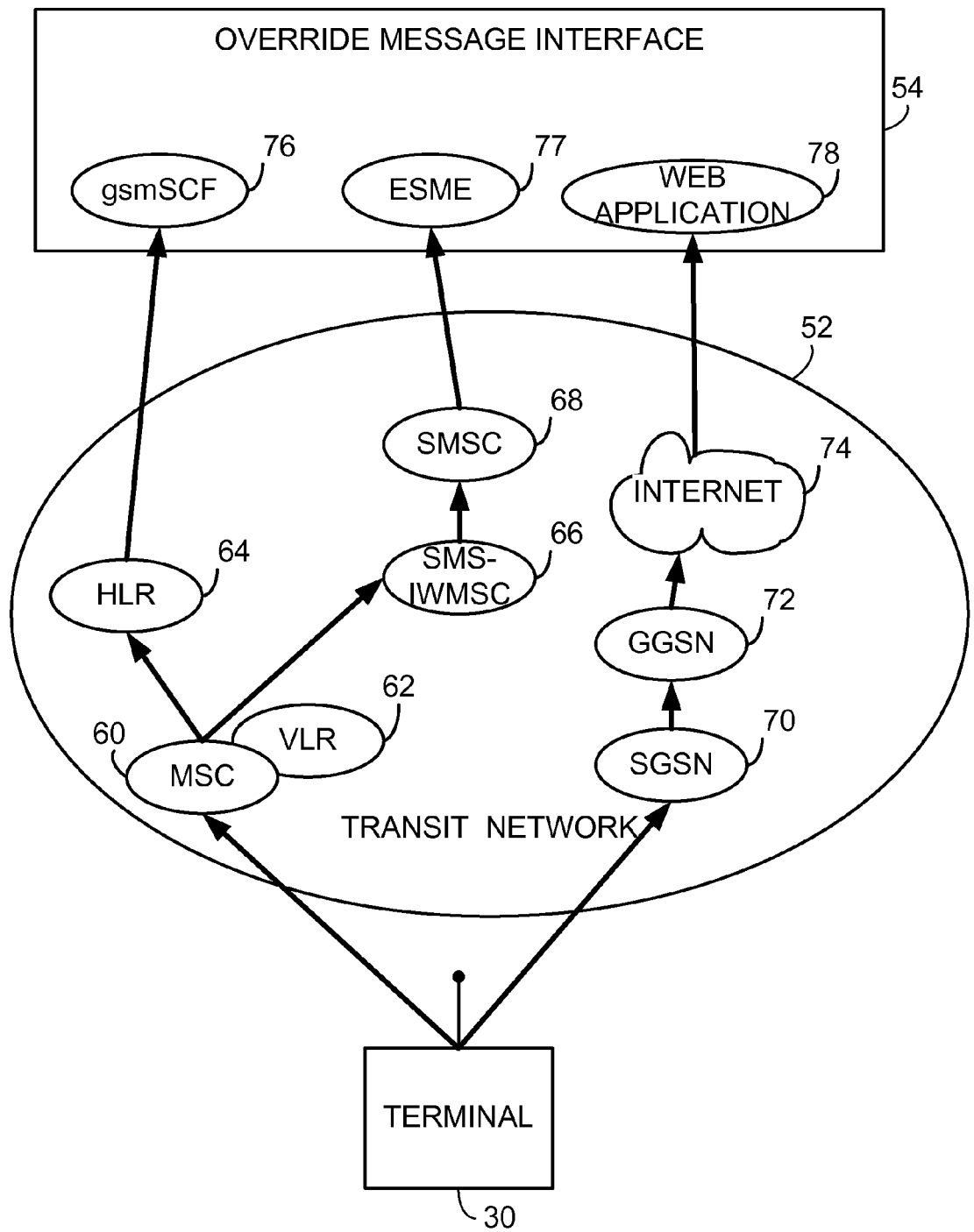
FIG. 4 is a diagrammatic view of portions of a communication system including a transit network and override message interface and illustrating constituent units of the transit network for various message transit modes.

FIG. 4 illustrates various example nodes and/or elements of an example transit network 52, and particularly so when the terminal is a wireless terminal, for example. FIG. 4 shows nodes or servers that may comprise transit network 52 for carrying the override message (and its override code 50) for each of the override message transit modes described above. For sake of accommodating all override message transmit modes FIG. 4 particularly shows transit network 52 as comprising mobile switching center (MSC) 60; Visitor Location Register (VLR) 62; Home Location Register (HLR) 64; SMS Interworking MSC (SMS-IWMSC) 66; Short Message Service Center (SMSC) 68; Serving GPRS Support Node (SGSN) 70; Gateway GPRS Support Node (GGSN) 72; and Internet 74.

FIG. 4 also shows various units, nodes, or functionalities which comprise override message interface 54 and which participate in or terminate the respective override messages, including GSM Service Control Function (gsmSCF) 76; External Short Messaging Entity (ESME) 77; and Web application 78. GSM Service Control Function (gsmSCF) 76 defines the intelligent network control environment for a mobile network and is enhanced to enable interworking with GSM/GPRS systems, and also stores service logic associated with intelligent network services. The External Short Messaging Entity (ESME) 77 comprises an external application that connects to an SMSC to engage in the sending and/or receiving of SMS messages. A web application is an application that is accessed over a network such as the Internet or an intranet, and may also mean a computer software application that is coded in a browser-supported language (such as JavaScript, combined with a browser-rendered markup language like HTML) and reliant on a common web browser to render the application executable.

Of the entities of transit network 52 shown in FIG. 4, mobile switching center (MSC) 60, Visitor Location Register (VLR) 62, and Home Location Register (HLR) 64 may be involved in handling and/or routing of the override message for both the voice override message mode and the USSD override message mode, which messages are terminated by or at the GSM Service Control Function (gsmSCF) 76 of override message interface 54. The mobile switching center (MSC) 60, Visitor Location Register (VLR) 62, SMS Interworking MSC (SMS-IWMSC) 66, and Short Message Service Center (SMSC) 68 may be involved in handling and/or routing of the override message for the SMS override message mode, which message is terminated by or at External Short Messaging Entity (ESME) 77 of override message interface 54. The Serving GPRS Support Node (SGSN) 70, Gateway GPRS Support Node (GGSN) 72, and Internet 74 may be involved in handling and/or routing of the override message for the Internet override message mode, which message is terminated by or at Web application 78 of override message interface 54.

The override message interface 54 may thus comprise one or more of the interface elements shown in FIG. 4, depending on for how many different modes of override message reception the charging system 22 is configured. For example, in one example embodiment charging system 22 may be configured to receive override messages only according to the SMS override message mode, and accordingly may exclusively or primarily comprise External Short Messaging Entity (ESME) 77. In another example embodiment charging system 22 may be configured to receive override messages only according to the Internet override message mode, and accordingly may exclusively or primarily comprise Web application 78. In yet another example embodiment override message interface 54 may be configured to receive override messages according to plural override message modes (such as, for example, the SMS override message mode and the USSD override message mode), and accordingly may comprise suitable nodes, servers, or devices for terminating or receiving messages according to those modes. Thus, either individual or various combinations of override message modes may be handled by charging system 22, depending on embodiment and configuration.

Figure 7:
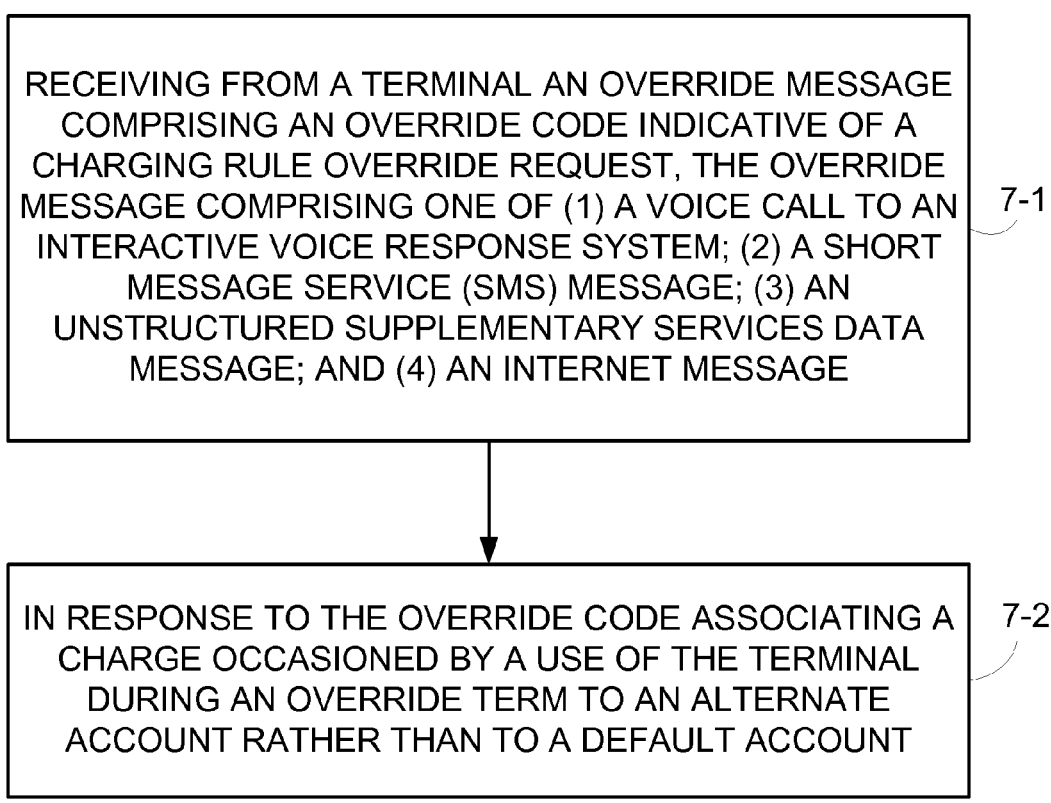
FIG. 7 is a flowchart showing example acts or steps which comprise an example embodiment of operating a charging system wherein charging override is implemented, emphasizing the manner of transmission or communication of the override code to charging system.

FIG. 7 shows example acts or steps which comprise an example embodiment of operating a charging system wherein charging override is implemented, emphasizing the manner of transmission or communication of the override code 50 to charging system 22. Act 7-1 comprises receiving, from a terminal, an override message comprising an override code indicative of a charging rule override request. As understood with reference to, e.g., FIG. 4, the override message comprises one of (1) a voice call to an interactive voice response system; (2) a Short Message Service (SMS) message; (3) an Unstructured Supplementary Services Data message; and (4) an Internet message. Act 7-2 comprises, in response to the override code (e.g., receipt by the charging system 22 of the override code 50), associating a charge occasioned by a use of the terminal during an override term to an alternate account rather than to a default account.

Figure 8:
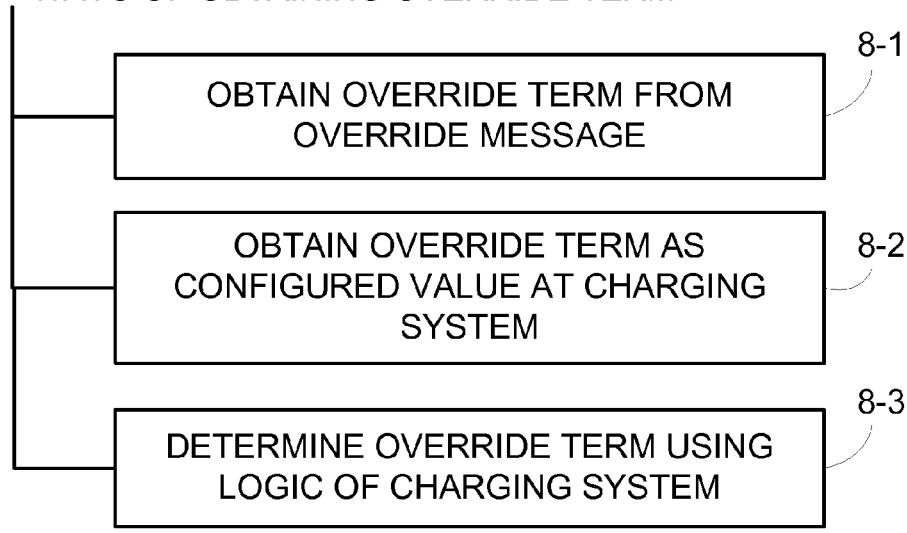
FIG. 8 is a diagrammatic view illustrating various different example embodiments and modes for determining or ascertaining an override term.

It was mentioned above (e.g., in conjunction with Act 3-2), that in response to receipt of the override code the charging system makes an association of a use of the terminal to an alternate account during an override term. How the override term is determined or ascertained may vary in accordance with different embodiments and modes. FIG. 8 illustrates various different example embodiments and modes for determining or ascertaining the override term.

In accordance with override term mode 8-1 the override message includes not only the override code 50, but also an indication of the override term. The charging system 22 uses the override term obtained from the override message in order to know to what extent (e.g., how long) the override instruction of override code 50 is to apply, e.g., how long a term to use the alternate account 46 rather than default account 44.

In accordance with override term mode 8-2 the override term is configured at the charging system. For example, the charging system may be pre-programmed or have pre-stored thereat a particular value or event. Such value may be, e.g., a default value, such as a predetermined time length value or predetermined resource value. In terms of time, such event may be a particular transaction, occurrence, milestone, or clock event that for which it would be reasonable for the override to cease, e.g., an end of a calendar day.

In accordance with override term mode 8-3 the charging system executes logic to determine the override term. For example, the charging system may execute logic which takes into consideration various historical activities or profile information of the user who may be using the terminal, and on the basis of such logic either determines (e.g., computes) the override term or fetches the override term from another node or server, for example.

In one or more of the above override term modes the charge occasioned by the service to the alternate account may be allocated during the override term and also for a time thereafter until the service terminates. That is, for a service begun before expiration of the override term the charge for any portion of the service that continues past the override term is also allocated to the alternate account.

The charging system 22 may be implemented in various different ways and in different embodiments. For example, charging system 22 may be implemented either in an account-centric embodiment (represented by FIG. 9) or in a product-centric embodiment (represented by FIG. 10, FIG. 11, and FIG. 12).

Figure 9:
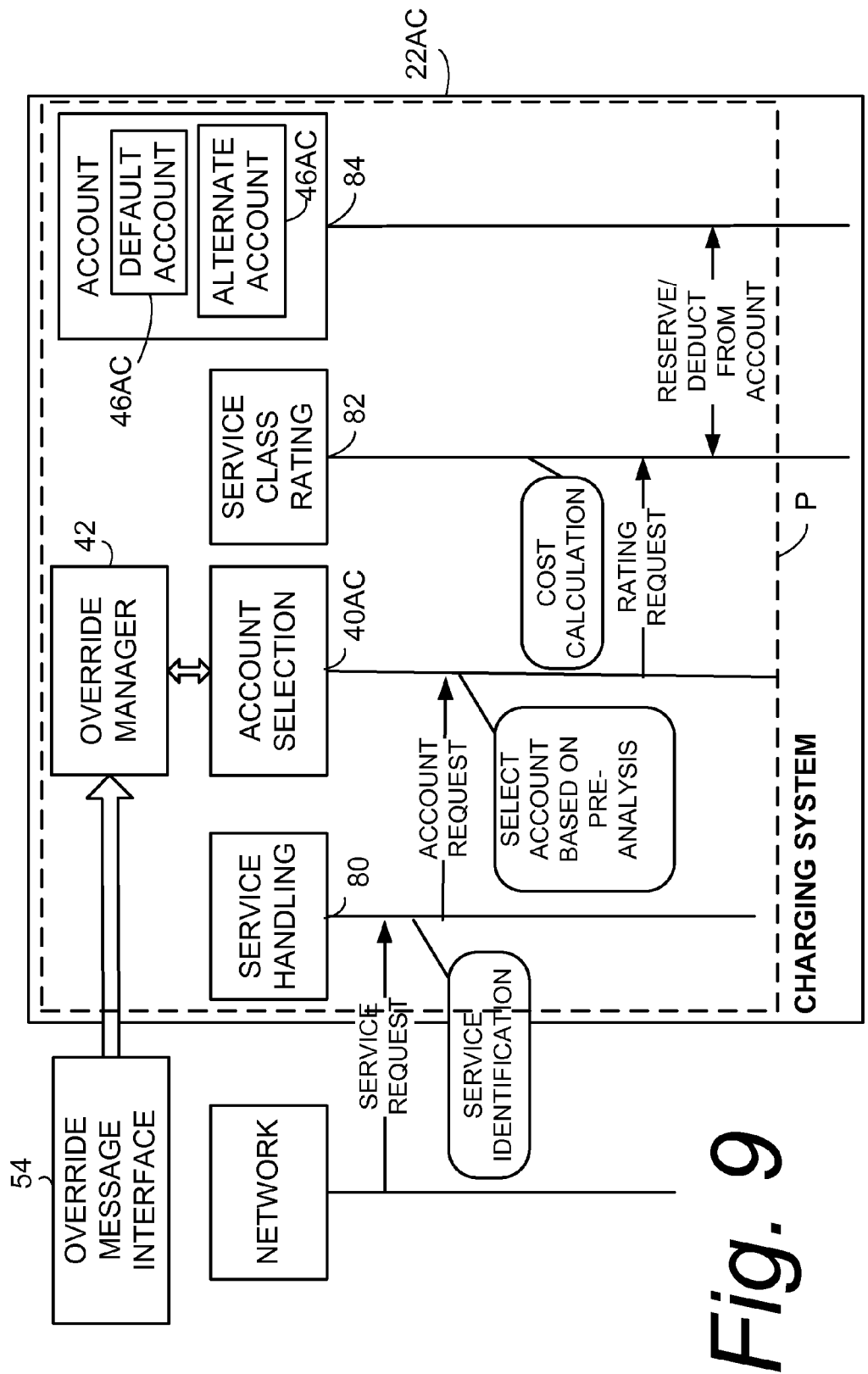
FIG. 9 is a diagrammatic view illustrating example actions involved in implementing various aspects of the technology disclosed herein in the context of an "account-centered" charging system.

FIG. 9 illustrates example actions involved in implementing various aspects of the technology disclosed herein in the context of an "account-centered" charging system 22AC. Describing in general direction from the left to the right of FIG. 9, a service handling component 80 of the account-centered charging system 22AC receives an event from a network. For example, service handling component 80 may receive a service request and determine from the service request what type of service is involved. For a telecommunications system, the service request may be for, e.g., voice, data traffic, etc. The service handling component 80 then attempts to identify the customer (not illustrated in FIG. 1), and thereafter invoke an account selection component 40AC of charging system 22AC. The account selection component 40AC attempts to determine, from account pre-analysis, what account(s) may be used based on a subscription for the identified customer. The input to query an account selection component is a combination of customer identifier, the segment (e.g., service class) of the customer, the service type, and maybe some other parameters that may be obtained from the network. Since one subscriber may have several different accounts, the account selection component attempts to determine which of the accounts are to be used (e.g., charged), or even if the account of another subscriber should be debited (e.g., a shared account).

As understood from the foregoing, when the charging system 22AC receives an override code 50, the override manager 42 causes the account selector 40AC to associate a charge occasioned by use of a terminal to the alternate account 46AC rather than to the default account 44AC. As also understood from the foregoing, the override code 50 may be received by any one of the override message modes described herein or encompassed hereby.

At this point the price for the service has not been calculated, the charging system 22AC knowing basically only that a certain type of service used, who is calling and who is being called, to which segment or quality class the telecommunication activity belongs, and which accounts for are eligible for charging. Then a service class rating component 82 of the charging system is consulted via a rating request in order, e.g., to identify the priority order for the account. When the service class rating is obtained, the charging system 22AC may start calculating the price for that service (e.g., a cost calculation). For example, if the telecommunication activity is a voice call during busy hour, the call may cost X per minute, and for a reservation of y minutes, and then the charging system will calculate what the cost for the reservation, and then try to reserve money from the appropriate eligible account maintained by an account component 84 of the charging system 22AC and as selected by account selector 40AC.

Thus, in an account-centered charging system 22AC such as that illustrated in FIG. 9, the account selection component 40AC with its account selection logic is called prior to calculating the cost. The account selection logic, which is subject to override message interface 54 when an override code 50 is received, selects which of possible different accounts to use. When the charging request is received, alternate account 46AC is chosen for the override time due to the earlier received override code 50.

Figure 10:
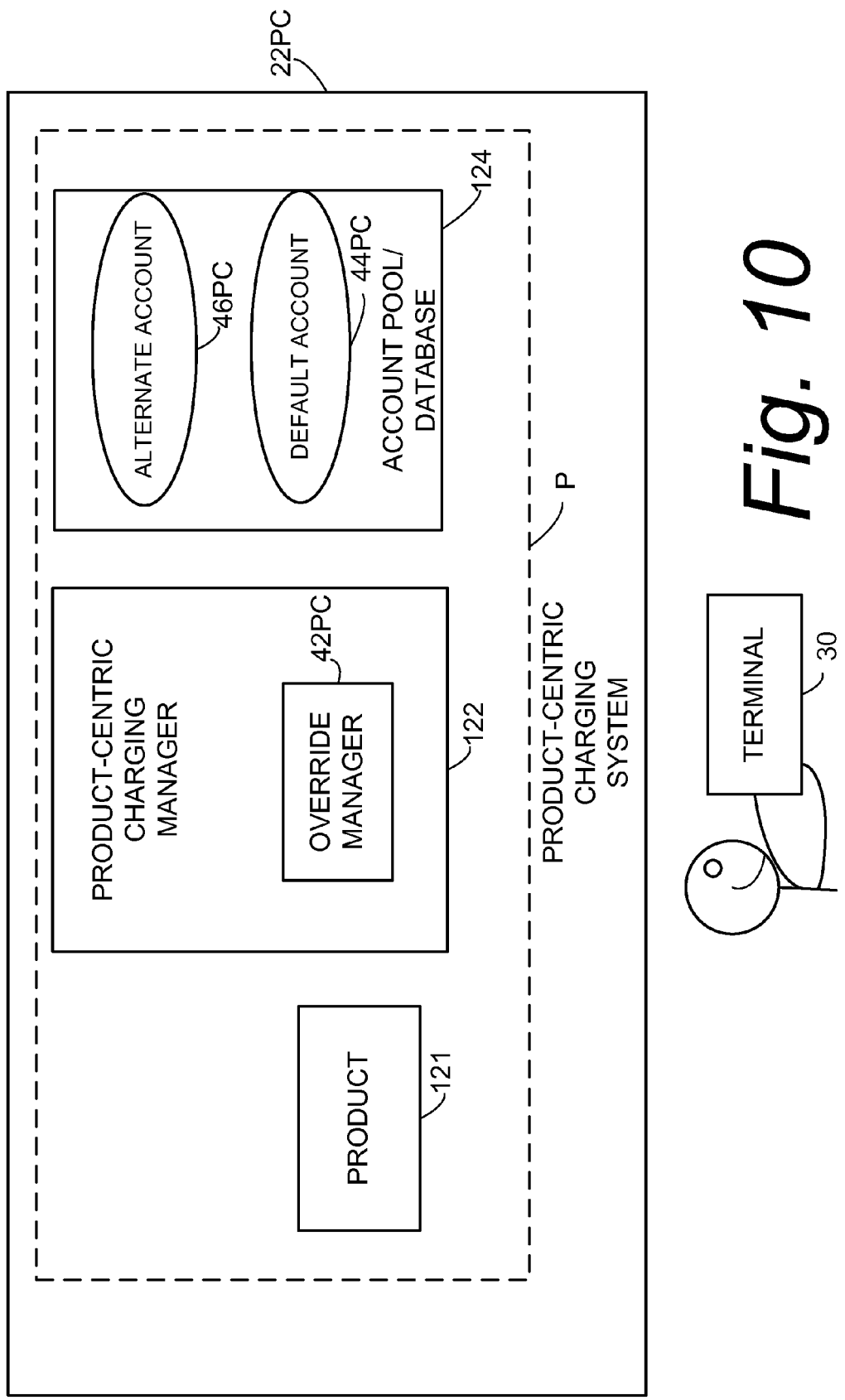
FIG. 10 is a schematic view of a communications system which utilizes a "product-centric" charging system for implementing the technology disclosed herein.
Figure 11:
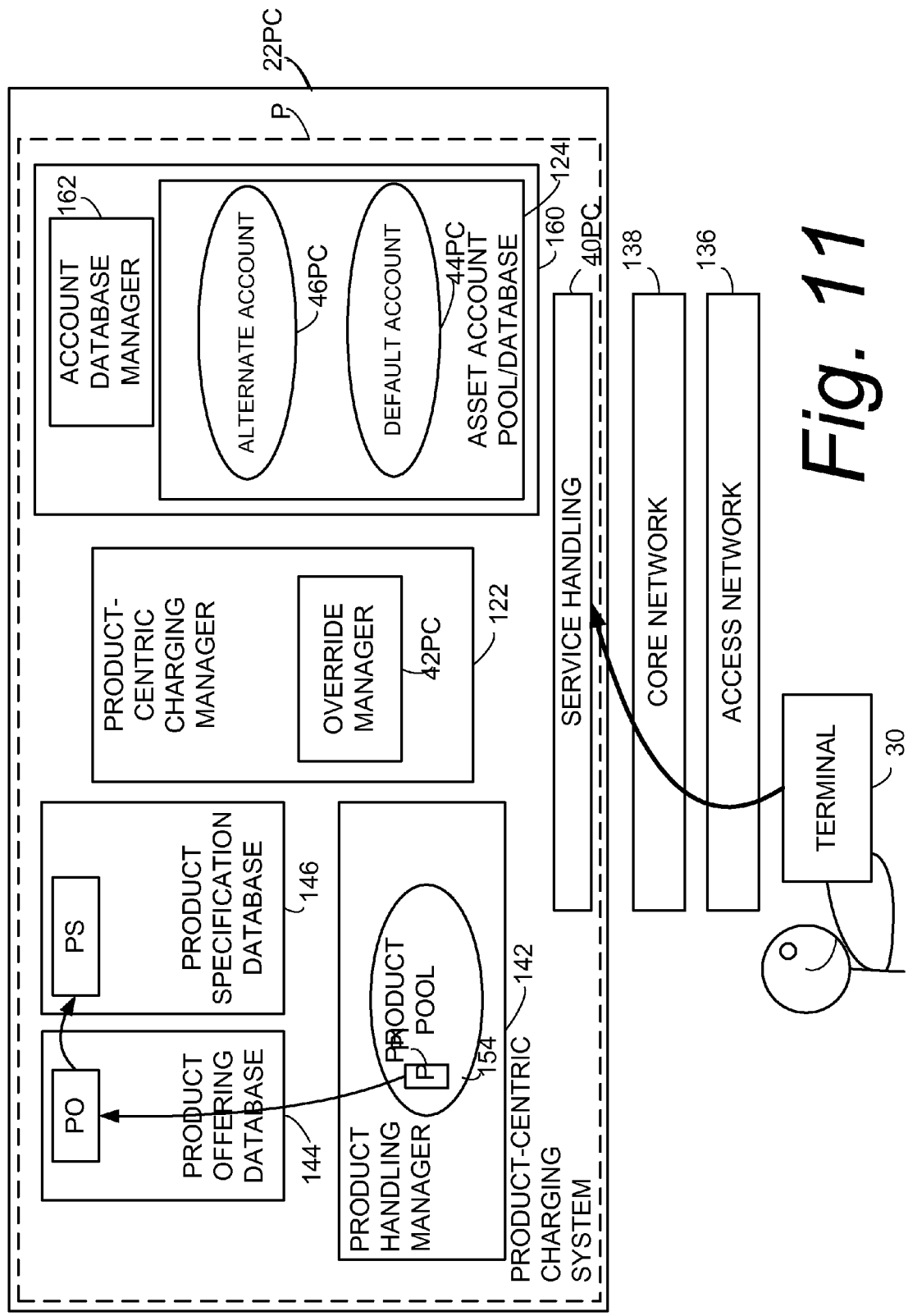
FIG. 11 is a schematic view of a more detailed embodiment of a communications system which utilizes a "product-centric" charging system for implementing the technology disclosed herein.
Figure 12:
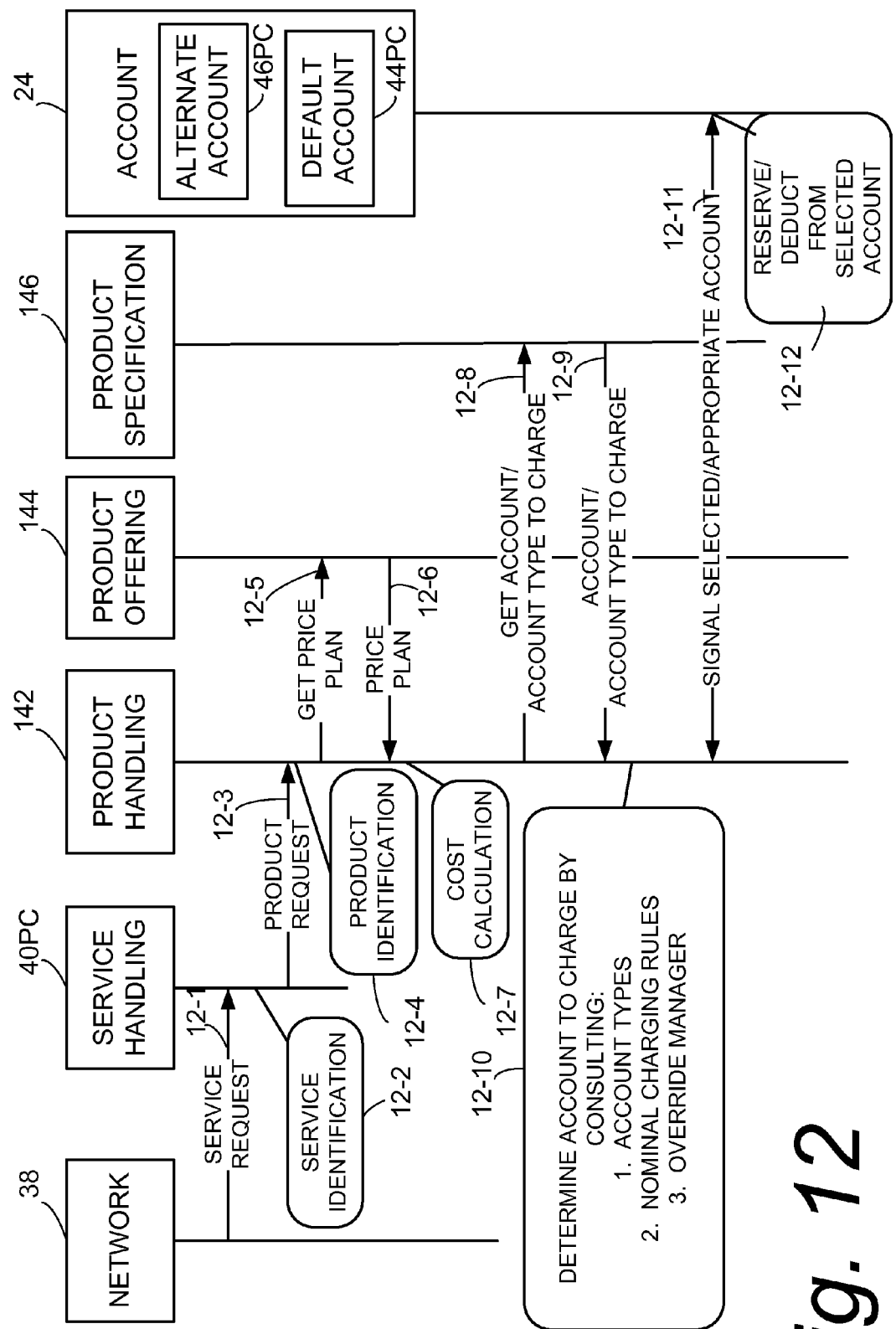
FIG. 12 is a diagrammatic view illustrating example actions involved in implementing various aspects of the technology disclosed herein in the context of a "product-centric" charging system.

FIG. 10, FIG. 11, and FIG. 12 illustrate implementation of various aspects of the technology disclosed herein in the context of a "product-centric" charging system 22PC. The charging system 22PC operates in product-centric manner to select, upon usage of a "product", one or more appropriate asset accounts to charge for the usage. The charge for the usage may take the form of an actual debit from the appropriate asset account(s) or a reservation of resources from the appropriate asset account(s).

In contrast to an account centric charging system, in a product-centric system accounts may be shared between products. Moreover, products may be shared between subscribers, but each product is normally kept self contained and independent of other products. A product-centric system with account type addressing may also add, change, and remove accounts without changing the consuming products.

As used herein, a "product" is not limited to a device or apparatus, but may comprise any service or commodity, whether offered for use or sold. For example, the product may be a telecommunications product, a telemarketing product, an internet or web-based product, a financial or banking product, to name a few. As used herein, a "telecommunications product" is not limited to a telecommunications device, but may comprise any commodity provided (e.g., offered or sold) by a telecommunications provider or network operator. For example, a telecommunications product may comprise a service plan or subscription such as a telecommunications voice service plan, or a telecommunications data service plan, or a plan which includes a combination of voice and data and/or other services. Moreover, a telecommunications product may also include one or more commodities that are described in other offerings of a telecommunications provider or network operator, such as purchasable deals for one or more services or features. Such deals may be characterized by time duration, time of the week or day, geographic location, nature of content (e.g., video), etc.

Typically the product consumer (e.g., a purchaser or recipient of the product 121) accesses to a "product", such as product 121 of FIG. 10, through a product utilization device. The product utilization device may be a terminal, such as terminal 30, for example. Accordingly, FIG. 10 shows a product consumer as using terminal 30 to gain access to product 121. The product 121 may represent any one of many different types of products, and further use of the phrase "product 121" herein is intended to refer to a product offered in conjunction with transmission or use of a telecommunications service such as a voice service or data service.

The capability of a terminal to initiate override of charging rules is also viewed in the product-centric embodiment and mode as being a product, e.g., a charging override product. In this regard, the charging system 22 may be considered as comprising charging override product master program. The charging override product master program may be stored as non-transitory executable program code in a memory of override manager 42PC, for example. When a product consumer sends an override code 50 to charging system 22, an instance of the charging override product master program, e.g., an instance of the override product, is generated for the code-sending product customer. It will be appreciated therefore that different instances of the charging override product program may be generated for different customers, or even different instances for the same customer at different points in time.

In accordance with an aspect of the technology disclosed herein, override manager 42PC of charging system 22PC serves to make an association of a use of the terminal 30 during an override term to alternate account 46PC rather than to a default account 44PC as would otherwise occur by implementation of a normal (e.g., non-overridden) charging rule. Thereafter, in conjunction with a service which is setup by a service setup request message which is subsequent and separate from the override message, the override manager 42PC allocates a charge for the service to the alternate account 46PC in accordance with the association.

As understood, for example from U.S. patent application Ser. No. 13/464,397 filed May 4, 2012, entitled "PRODUCT-CENTRIC CHARGING SYSTEM AND METHOD", incorporated by reference herein, in a product-centric charging system the asset accounts of the pool of asset accounts 124 may be grouped into account type classifications; and the product 121 also classified according to at least one of the account type classifications. When a charge needs to be made for use of a product, the product-centric charging manager 122 selects from the pool of plural asset accounts 124 one or more of the asset accounts belonging to the appropriate account type classification(s) (the account type classification (s) of the product 121) to charge for a service request involving the product 121. In this way the charge may to be an appropriate one of any of the similarly account-type classified asset accounts of the pool 124, based on the account type classification of the product 121, thus rendering the charging "product-centric" rather than account-centric.

FIG. 11 shows an example embodiment of product-centric charging system 22PC in more detail, as well as an example context in which the charging system 22PC operates when a service is requested for terminal 30. In particular, FIG. 11 shows that terminal 30 is connected by access network 136 to core network 138, and that from core network 138 the charging system 22PC receives service requests. The access network 136 can be any suitable type of access network, a radio access network being just one example.

FIG. 11 further shows that the example charging system 22PC comprises various constituent charging functionalities or units in addition to product-centric charging manager 122 and the pool 124 of plural asset accounts. Among the example functionalities shown are service handling unit 40PC; product handling manager 142; product offering database 144; product specification database 146. In FIG. 11, the pool 124 of plural asset accounts is also shown/known as asset account database 124.

As shown in FIG. 11, product offering database 144 includes a "product offering" (PO) for the product 121. The product offering database 144 has availability not only of the example representative product 121, but also products. Product offering database 144 comprises information that is presented to the customer for identifying and/or advertising the product, e.g., sales or use contract terms.

For each product offering (PO) in product offering database 144 there is a corresponding product specification (PS) in product specification database 146. Each product offering database 144 points or refers or incorporates a corresponding entry or record (e.g., specification) in product specification database 146. A product specification (PS) in the product database 146 includes a description of the product, including what services the product may use, how to charge for the product, how the product is rated (e.g., quality of service rating), and the technical specifications for the product, etc.

When a customer purchases or otherwise acquires a product defined by a product offering (PO), an "instance" of the purchased product is created in product pool 154 for the customer. For example, if the customer who uses terminal 30 purchases the product 21, a corresponding product instance PI is created in product pool 154. As shown by an arrow, the product instance PI refers or points to or incorporates the product offering PO in product offering database 144. The product offering PO in product offering database 144 in turns refers or points to or incorporates the product specification PS in product specification database 146 (as shown by another arrow).

Thus, when a product is purchased or acquired through acceptance or purchase of a product offering, the charging system 22PC creates an instance (PI) of the product in product pool 154. The instance of the product refers to the corresponding record in product offering database 144, which in turn refers to the corresponding specification for that product in product specification database 146.

The product-centric charging system 22PC utilizes an "account type" classification as a way to represent a number of accounts which can be charged upon product usage. An account is an instantiated asset that belongs to a certain account type. An account can be seen as an asset container holding e.g. monetary units, counter, pieces, etc.

FIG. 11 also shows pool 124 of plural asset accounts in more detail for an example embodiment. The pool 124 of plural asset accounts comprises or at least partially forms account subsystem 160 of charging system 22PC. The account subsystem 160 includes not only the pool 124 of plural asset accounts, but also an account database manager 162. The account database manager 162 serves essentially as an interface for access (e.g., input and output operations) with respect to the accounts maintained in the pool 124 of plural asset accounts. Each asset in the pool 124 is classified according to one or more "account types", e.g., "account type classifications".

FIG. 12 illustrates example acts of a product-centric charging system according to an example embodiment. The acts of FIG. 12 are coordinated and controlled by the product-centric charging manager 122 of the charging system 22PC. Act 12-1 of FIG. 12 represents receipt of a service request. The service request of act 12-1 may be from a network, e.g., a telecommunications network. The service request of act 12-1 may be prompted by some event in the network that requires a payment or reservation of funds from an account in order for the service to be initiated or continued. The service request of act 12-1 is received by service handling unit 40PC. Act 12-2 of FIG. 12 comprises the service handling unit 40PC identifying the service, e.g., a voice service or data service, for example.

Then, rather than proceeding to account selection as would an account-centric charging system, the product-centric charging manager 122 has service handling unit 140 make a product request (act 12-3) of the product handling manager 142. The purpose of the product request of act 12-3 is to identify which products of product pool 154 may be appropriate for the service request issued as act 12-1. The service request of act 12-1 may have been issued for a voice service, so in response to the product request of act 12-3, as act 12-4 the product handling manager 142 checks the product pool 154 for the customer for whom the service request was issued and makes a product identification. The product identification of act 12-4 may indicate that the customer has two voice products, e.g., a first product being an ordinary voice product and a second voice product being a discounted voice product. So as a result of the product request of act 12-3, as act 12-4 the eligible products suitable for the particular service request are identified.

Having identified the eligible products available to the customer for the particular service for which the service request was received, the pricing plan for each of the eligible products may be fetched. Act 12-5 comprises the product handling manager 142 requesting, from product offering database 144, a price plan for each of the eligible products identified by act 12-4. As act 12-6 the product offering database 144 returns a price plan for each eligible product. Based on the price plans return as act 12-6, the product handling manager 142 determines which of the eligible products has the most appropriate price plan, and makes a cost calculation as act 12-7. In the example scenario being discussed, the discounted voice product would be the most appropriate and accordingly as act 12-7 the cost calculation for the service request of act 12-1 is made with respect to the discounted voice product. Thus, at this stage it is understood that the product 121 shown in FIG. 10 and FIG. 11 represents the selected voice product for this example scenario.

Having determined what product is to be allocated to the service request, and the cost of the product in fulfillment of the service request, the product-centric charging manager 122 seeks to determine which asset account of pool 124 of plural asset accounts is to be charged, debited, or have assets reserved for the service request. At this point the override manager 42PC overrides the ordinary (non-overridden) operation of the product-centric charging system 22PC.

Ordinarily the product handling manager 142 would send a request to product specification database 146 in order to determine which account, or which account type, is to be charged for the service request. The product specification database 146 would then, in ordinary (non-overridden operation) return either an identification of an account or an account type classification which is appropriate to charge for the product which is allocated to the service request of act 12-1. In the example scenario being discussed, an appropriate account type classification may be "voice money".

Having received from product specification database 146 either the account or the appropriate account type classification for the product, as act 12-10 the product handling manager 42 attempts to determine the appropriate asset accounts in pool 24 of plural asset accounts that may be charged, debited, or reserved for the service request of act 6-1. If all that is returned from the product specification database 46 as act 12-9 is an identification of a particular account, or a particular code that indicates that only one particular account may be charged, then such particular account may be charged for the service request if so permitted by override manager 42PC. But if the product specification database 46 returns an account type classification as act 12-9, the determination of act 12-10 is based on the account type classification for the product and possibly other information and interaction as well, such as an account selection rule which may comprise the account type definition and/or intervention of override manager 42PC.

If an account type classification is returned from product specification database 46, act 12-10 comprises determining the actual account to charge. Determining what account to charge may comprise three aspects, as shown in FIG. 12. A first aspect comprises consulting the accounts in the account pool 124 for the corresponding account type. A second aspect comprises checking the nominal charging rules 48, since the nominal charging rules 48 may provide criteria for selecting the actual account to charge, e.g., for selecting between two or more accounts that may have satisfied the first aspect (e.g., which have the same/corresponding account type). A third aspect comprises checking override manager 42C to determine if the nominal charging rules 48 are overridden (as should occur when a override code 50 is received from the terminal 30). After the decision is made at act 12-10 as to which account to charge, as act 12-11 an instruction or signal is sent to the selected account. As act 12-11 the product handling manager 42 actually charges the appropriate asset account. Such appropriate asset account will be the alternate account 46PC rather than default account 44PC when the override duration time is still extant after terminal 30 sends the override code 50.

From the foregoing it will be appreciated that the technology disclosed herein also encompasses a charging system configured to associate a charge occasioned by use of a terminal during an override term to an alternate account rather than to a default account in response to an override code, and that the charging system may receive the override code through an interface connected to the charging system and which handles override message. The override message may comprise one of (1) a voice call to an interactive voice response system; (2) a Short Message Service (SMS) message; (3) an Unstructured Supplementary Services Data message; and (4) an Internet message.

In an example embodiment and as depicted by way of example in FIG. 1, FIG. 9, FIG. 10, FIG. 11, and FIG. 12, the charging systems may be realized by a machine platform. To this end the figures employ a broken line to represent machine platform P which comprises the charging system. The terminology "machine platform" is a way of describing how the functional units of the charging system may be implemented or realized by machine. The machine platform P can take any of several forms, such as (for example) logic processing circuitry such as, but not limited to, electronic circuitry in the form of a computer implementation platform or a hardware circuit platform. A computer implementation may comprise a processor or controller which may serve as multi-part feedback signal 22 by executing instructions stored in a non-transient computer-readable medium, such as an instruction memory, for example.

It was mentioned above that the access network 36 can be any suitable type of access network, and that a radio access network is just one example. In a typical cellular radio system, the terminal may be a wireless terminal (also known as mobile station and/or user equipment unit (UE)) which communicate via a radio access network to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). In some versions of the radio access network, several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

The technology disclosed herein may be used in conjunction with the technology of U.S. patent application Ser. No. 13/538,340, filed on Jun. 29 2012, entitled "TELECOMMUNICATIONS CHARGING WITH EXTERNALLY-CONTROLLED ACCOUNT SELECTION", which is incorporated herein by reference in its entirety.

The technology disclosed herein advantageously allows use of a phone book or directory as usual, without having to dial a prefix in front of or in conjunction with telecommunication activities.

In an example embodiment, whatever number is used as the override code 50, e.g., a phone number or USSD string, may be stored in a contact list or the like.

Call Detail Records (CDRs) generated may be collected by the company to limit misuse of the override function. The generated CDRs may include which product that has been used and, in the case a company account is used outside office hours, it is possible to generate a report sent to the company to control possible misuse.

In an example embodiment and mode the override feature may be combined with a timer so that the override term is automatically terminated at a specified or default time, thereby counteracting any tendency for a subscriber to forget to turn off the override feature.

The override feature may be implemented in various circumstances and contexts, e.g., applied to family accounts where it is possible to set aside the rules when the parents' accounts are used or not.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of operating a communications charging system comprising:
receiving, by the communications system, an override message comprising an override code indicative of a charging rule override request which affects a terminal;
in response to the override code, creating, by the communications charging system, an instance of an override product for use by the terminal, the instance of the override product being configured to associate use of the terminal during an override term to an alternate account rather than to a default account as would otherwise occur by a charging rule; and thereafter at reception of a charging request which is subsequent and separate from the override message, allocating, by the communications charging system, a charge for a service for which the charging request occurs to the alternate account in accordance with the association.

2. The method of claim 1, comprising receiving, from a source other than the terminal, the override code indicative of the charging rule override request which affects the terminal.

3. The method of claim 1, wherein the service is initiated by a service request message which is subsequent and separate from the override message, and wherein the method further comprises the charging system during the override term automatically allocating the charge to the alternate account without any additional indication in or accompanying the service request message that the service is to be associated with the alternate account.

4. The method of claim 1, wherein the override term is defined by one or more of an override time period; a resource measure, or one or more telecommunications events.

5. The method of claim 1, further comprising allocating the charge to the alternate account during the override term and also for a time thereafter until the service terminates.

6. The method of claim 1, wherein the override message further includes an indication of the override term, and further comprising the charging system obtaining the override term from the override message.

7. The method of claim 1, further comprising the charging system determining the override term.

8. The method of claim 1, further comprising configuring the override term at the charging system.

9. The method of claim 1, wherein the override term lasts until reception of an override rescind message.

10. The method of claim 1, further comprising receiving the override code through the Internet.

11. The method of claim 1, further comprising receiving the override code in a voice call with consultation of a Home Location Register.

12. The method of claim 1, further comprising receiving the override code in a Unstructured Supplementary Services Data message with consultation of a Home Location Register.

13. The method of claim 1, further comprising receiving the override code in a Short Message Service (SMS) message from a transit network, the transit network comprising a Short Message Service Center (SMSC) node.

14. The method of claim 1, further comprising using a logic processing circuit to perform the acts of claim 1.

15. A charging system configured to associate a use of a terminal during an override term to an alternate account rather than to a default account in response to an override code received in an override message, the charging system being further configured, in response to the override code, to create an instance of an override product for the terminal, the instance of the override product being configured to associate use of the terminal for the override term to the alternate account rather than to the default account, the charging system being further configured, in conjunction with a charging request which is subsequent and separate from the override message, to allocate a charge for a service for which the charging request occurs to the alternate account in accordance with the association.

16. The system of claim 15, further comprising an interface through which the override code indicative of the charging rule override request is received from a source other than the terminal.

17. The system of claim 15, wherein the service is initiated by a service request message which is subsequent and separate from the override message, and wherein the charging system is configured, during the override term, to automatically allocate the charge to the alternate account without any additional indication in or accompanying the service request message that the service is to be associated with the alternate account.

18. The system of claim 15, wherein the override term is defined by one or more of an override time period; a resource measure, or one or more telecommunications events.

19. The system of claim 15, wherein the charging system is further configured to allocate the charge to the alternate account during the override term and also for a time thereafter until the service terminates.

20. The system of claim 15, wherein the override message further includes an indication of the override term, and wherein the charging system is configured to obtain the override term from the override message.

21. The system of claim 15, wherein the charging system is configured to determine the override term.

22. The system of claim 15, wherein the override term is configured at the charging system.

23. The system of claim 15, wherein the override term lasts until reception of an override rescind message.

24. The system of claim 15, further comprising an interface through which the charging system receives the override message from the Internet.

25. The system of claim 15, further comprising an interface through which the charging system receives the override code when the override message is included in a voice call.

26. The system of claim 15, further comprising an interface through which the charging system receives the override code when the override message comprises a Unstructured Supplementary Services Data message.

27. The system of claim 15, further comprising an interface through which the charging system receives the override code when the override message comprises a Short Message Service (SMS) message.

28. A system of claim 15, wherein the charging system comprising a logic processing circuit.

\* \* \* \* \*

UNITED STATES PATENT AND TRADEMARK OFFICE
CERTIFICATE OF CORRECTION

PATENT NO. : 8,862,093 B2
APPLICATION NO. : 13/538000
DATED : October 14, 2014
INVENTOR(S) : Zackrisson Page 1 of 1

It is certified that error appears in the above-identified patent and that said Letters Patent is hereby corrected as shown below:

In the specification

In Column 2, Line 38, delete "Register," and insert -- Register. --, therefor.

In Column 7, Line 44, delete "terminal 31" and insert -- source 31 --, therefor.

In the claims

In Column 22, Line 32, in Claim 28, delete "A system" and insert -- The system --, therefor.

Signed and Sealed this
Twenty-sixth Day of July, 2016

Michelle K. Lee
*Director of the United States Patent and Trademark Office*